(12) United States Patent
Kubo et al.

(10) Patent No.: US 12,287,503 B2
(45) Date of Patent: Apr. 29, 2025

(54) LIGHT-ABSORBING COMPOSITION AND OPTICAL FILTER

(71) Applicant: Nippon Sheet Glass Company, Limited, Tokyo (JP)

(72) Inventors: Yuichiro Kubo, Tokyo (JP); Katsuhide Shimmo, Kanagawa (JP); Lei Cai, Kanagawa (JP); Yoshihiro Takayanagi, Kanagawa (JP); Hitomi Masuda, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 702 days.

(21) Appl. No.: 17/604,213

(22) PCT Filed: Apr. 17, 2020

(86) PCT No.: PCT/JP2020/016925
§ 371 (c)(1),
(2) Date: Oct. 15, 2021

(87) PCT Pub. No.: WO2020/213726
PCT Pub. Date: Oct. 22, 2020

(65) Prior Publication Data
US 2022/0206198 A1 Jun. 30, 2022

(30) Foreign Application Priority Data
Apr. 18, 2019 (JP) ................................. 2019-079028

(51) Int. Cl.
| | | |
|---|---|---|
| C09D 7/63 | (2018.01) | |
| C07F 9/38 | (2006.01) | |
| C08K 5/5317 | (2006.01) | |
| C08K 5/5415 | (2006.01) | |
| C09D 183/04 | (2006.01) | |
| G02B 5/22 | (2006.01) | |

(52) U.S. Cl.
CPC ............ *G02B 5/223* (2013.01); *C07F 9/3834* (2013.01); *C08K 5/5317* (2013.01); *C08K 5/5415* (2013.01); *C09D 7/63* (2018.01); *C09D 183/04* (2013.01)

(58) Field of Classification Search
CPC ......... C07F 9/3834; G02B 5/223; C09D 7/63; C09D 183/04; C08K 5/5317; C08K 5/5415
USPC .......................................................... 524/132
See application file for complete search history.

(56) References Cited

U.S. PATENT DOCUMENTS

| | | | |
|---|---|---|---|
| 6,284,385 B1 | 9/2001 | Guillaumon et al. | |
| 2018/0003872 A1 | 1/2018 | Kubo et al. | |
| 2019/0346601 A1 | 11/2019 | Kubo et al. | |
| 2020/0040161 A1* | 2/2020 | Kubo ................... | C08K 5/5317 |
| 2020/0158930 A1 | 5/2020 | Kubo | |
| 2020/0198298 A1 | 6/2020 | Imanishi et al. | |
| 2022/0057556 A1 | 2/2022 | Kubo et al. | |
| 2023/0400615 A1 | 12/2023 | Kubo et al. | |

FOREIGN PATENT DOCUMENTS

| | | | |
|---|---|---|---|
| JP | S5984920 A | 5/1984 | |
| JP | 2007153691 | 6/2007 | |
| JP | 2009242650 A | 10/2009 | |
| JP | 2015174270 | 10/2015 | |
| JP | 6232161 B1 | 11/2017 | |
| JP | 6281023 B2 | 2/2018 | |
| JP | 6339755 B1 | 6/2018 | |
| JP | 6639764 B1 | 2/2020 | |
| WO | 2016121855 A1 | 8/2016 | |
| WO | 2017126528 | 7/2017 | |
| WO | WO-2017126528 A1 * | 7/2017 | ............... G02B 5/22 |
| WO | 2018173386 | 9/2018 | |
| WO | 2019030106 A1 | 2/2019 | |
| WO | 2019044758 | 3/2019 | |
| WO | 2020054400 A1 | 3/2020 | |

OTHER PUBLICATIONS

International Search Report and Written Opinion issued for International Patent Application No. PCT/JP2020/016925, Date of mailing: Jul. 14, 2020, 8 pages including English translation of Search Report.
U.S. Appl. No. 18/248,836, filed Apr. 12, 2023, US 2023-0400615 A1.
International Search Report and Written Opinion issued for International Patent Application No. PCT/JP2021/034864, Date of mailing: Dec. 7, 2021, 8 pages including English translation of Search Report.

* cited by examiner

*Primary Examiner* — Kelechi C Egwim
(74) *Attorney, Agent, or Firm* — HSML P.C.

(57) ABSTRACT

A light-absorbing composition according to the present invention includes: a light absorber; a curable resin; and an alkoxysilane. The alkoxysilane includes a dialkoxysilane. Since the alkoxysilane of the light-absorbing composition includes the dialkoxysilane, desired flexibility is likely to be imparted to a light-absorbing layer owing to an organic functional group of the dialkoxysilane while a strong skeleton having a siloxane bond is formed in the light-absorbing layer.

15 Claims, 4 Drawing Sheets

LIGHT-ABSORBING COMPOSITION AND OPTICAL FILTER

TECHNICAL FIELD

The present invention relates to a light-absorbing composition and an optical filter.

BACKGROUND ART

In imaging apparatuses employing a solid-state image sensing device such as a charge coupled device (CCD) or a complementary metal oxide semiconductor (CMOS), any of various optical filters is disposed ahead of the solid-state image sensing device in order to obtain an image with good color reproduction. Solid-state image sensing devices generally have spectral sensitivity over a wide wavelength range extending from the ultraviolet to infrared regions. On the other hand, the visual sensitivity of humans lies solely in the visible region. Thus, a technique is known in which an optical filter blocking a portion of infrared light or ultraviolet light is disposed ahead of a solid-state image sensing device in an imaging apparatus in order to allow the spectral sensitivity of the solid-state image sensing device to approximate to the visual sensitivity of humans.

It has been common for such an optical filter to block infrared light or ultraviolet light by means of light reflection by a dielectric multilayer film. In recent years, optical filters including a light absorber-including film have been attracting attention. The transmittance properties of optical filters including a light absorber-including film are unlikely to be dependent on the incident angle, and this makes it possible to obtain favorable images with less color change even when light is obliquely incident on the optical filters in imaging apparatuses. Good backlit or nightscape images are more likely to be obtained using optical filters of light-absorbing type not including a light-reflecting film because such optical filters can reduce occurrence of ghosting and flare caused by multiple reflection in the light-reflecting film. Moreover, optical filters including a light absorber-including film are advantageous also in terms of size reduction and thickness reduction of imaging apparatuses.

For example, Patent Literature 1 describes an optical filter including a UV-IR absorbing layer capable of absorbing infrared light and ultraviolet light. The UV-IR absorbing layer includes a UV-IR absorber formed of phosphonic acid and copper ion. Patent Literature 2 describes an infrared cut filter including an organic dye-including layer and a copper phosphonate-including layer.

CITATION LIST

Patent Literature 1: JP 6232161 B1
Patent Literature 2: JP 6281023 B2

SUMMARY OF INVENTION

Technical Problem

The techniques described in Patent Literatures 1 and 2 leave room for reexamination in terms of imparting desired flexibility to light-absorbing layers of optical filters. Therefore, the present invention provides a light-absorbing composition advantageous in terms of imparting desired flexibility to a light-absorbing layer of an optical filter. The present invention also provides an optical filter including a light-absorbing layer having desired flexibility.

Solution to Problem

The present invention provides a light-absorbing composition including:
a light absorber;
a curable resin; and
an alkoxysilane, wherein
the alkoxysilane includes a dialkoxysilane.

The present invention also provides an optical filter including a light-absorbing layer formed of a cured product of the above light-absorbing composition.

The present invention also provides an optical filter including a light-absorbing layer including a light absorber and a hydrolysis-condensation product of an alkoxysilane, wherein
the light-absorbing layer has an average Young's modulus of 2.00 GPa or less and an average hardness of 0.06 GPa or less when a principal surface of the light-absorbing layer is measured using a nanoindenter by a nanoindentation technique (continuous stiffness measurement technique).

Advantageous Effects of Invention

The above light-absorbing composition is advantageous in terms of imparting desired flexibility to a light-absorbing layer of an optical filter. The light-absorbing layer of the above optical filter has desired flexibility.

DESCRIPTION OF EMBODIMENTS

Figure 1:
FIG. 1 is a cross-sectional view showing an example of an optical filter according to the present invention.

As optical filters including a light-absorbing layer, there are an optical filter of such a type that the optical filter is composed only of a light-absorbing layer and an optical filter of such a type that the optical filter includes a light-absorbing layer arranged on a base made of glass, resin, or the like. In the case of the former type of optical filter, when its light-absorbing layer is rigid or has high hardness like glass, the light-absorbing layer tends to have low flexibility and is, for example, broken or wrinkled by bending or mechanically deforming the optical filter. In the case of the latter type of optical filter including a light-absorbing layer arranged on a flexible base made of a resin or the like, the light-absorbing layer can also be broken or wrinkled by deforming the optical filter in the same manner. Therefore, these types of optical filters need to be treated very carefully.

In manufacturing process, a tool, such as a large slicer, for cutting glass is necessary to produce a chip by cutting an optical filter formed to have a large area. Additionally, it is necessary in some cases to consider cracking or chipping which is a problem associated with the character of a glass material at the time of cutting an optical filter. Furthermore, when an optical filter to be disposed on and adhered to a sensor such as a solid-state image sensing device is rigid, a warp (unevenness) inherent in the optical filter makes it difficult to dispose and adhere the optical filter in some cases. Increasing the flexibility of a light-absorbing layer is advantageous in terms of making these processing operations easier.

The present inventors thus made intensive studies to discover a technique advantageous in terms of imparting the desired flexibility to a light-absorbing layer and invented the light-absorbing composition and the optical filter according to the present invention.

Hereinafter, embodiments of the present invention will be described. The following description is directed to some examples of the present invention, and the present invention is not limited by these examples.

The light-absorbing composition according to the present invention includes a light absorber, a curable resin, and an alkoxysilane. In addition, the alkoxysilane includes a dialkoxysilane.

When a light-absorbing layer is formed using the light-absorbing composition, hydrolysis of the alkoxysilane generates a silanol group. A compound having the generated silanol group and derived from the alkoxysilane further undergoes reaction of polycondensation to form a strong skeleton having a siloxane bond (—Si—O—Si—). If the amount of an organic component (organic functional group) is small in a material having the skeleton, a light-absorbing layer to be formed thereof is unlikely to have the desired flexibility. In this case, the skeleton having a siloxane bond easily ruptures upon local application of a high pressure to the light-absorbing layer. However, since the alkoxysilane of the light-absorbing composition includes the dialkoxysilane, the desired flexibility is likely to be imparted to a light-absorbing layer owing to an organic functional group of the dialkoxysilane while a strong skeleton having a siloxane bond is formed in the light-absorbing layer. As a result, for example, cracking and chipping are less likely to be caused by cutting a light-absorbing layer formed using the light-absorbing composition. Moreover, a light-absorbing layer formed using the light-absorbing composition is less likely to be broken even if the light-absorbing layer is bent.

It is conceivable that the light-absorbing composition is applied, for example, onto a solid-state image sensing device such as a CCD or a CMOS or an optical component to provide an optical filter integrated with the image sensing device or the optical component. When the optical filter integrated with the image sensing device or the optical component is placed in a given heat cycle environment, thermal expansion and thermal shrinkage may happen. A light-absorbing layer formed using the light-absorbing composition is likely to have the desired flexibility and deform in response to thermal expansion and thermal shrinkage. Thus, breakage of and damage to the light-absorbing layer are likely to be reduced.

Furthermore, in the case of a highly flexible optical filter produced as a filter having a flat surface, a curved surface can be formed by bending the optical filter along a curved plane on which the optical filter is to be disposed to mount the optical filter in the optical system. If a principal surface of the optical filter is a curved surface, a special imaging apparatus can be designed on the assumption of complex disposition of a sensor.

The dialkoxysilane is not limited to a particular dialkoxysilane. The dialkoxysilane has, for example, a hydrocarbon group bonded to a silicon atom and having 1 to 6 carbon atoms. The alkoxysilane may have a halogenated hydrocarbon group in which at least one hydrogen atom of a hydrocarbon group bonded to a silicon atom and having 1 to 6 carbon atoms is substituted by a halogen atom. Moreover, in this case, the desired flexibility is likely to be imparted to a light-absorbing layer formed using the light-absorbing composition.

The dialkoxysilane may be, for example, an alkoxysilane represented by the following formula (b). In this case, the desired flexibility is likely to be imparted more reliably to a light-absorbing layer formed using the light-absorbing composition.

$(R_2)_2—Si—(OR_3)_2$ \hfill (b)

In the formula, each $R_2$ is independently an alkyl group having 1 to 6 carbon atoms, and each $R_3$ is independently an alkyl group having 1 to 8 carbon atoms.

The dialkoxysilane may be dimethyldiethoxysilane, dimethyldimethoxysilane, 3-glycidoxypropylmethyldimethoxysilane, or 3-glycidoxypropylmethyldiethoxysilane.

In the light-absorbing composition, the alkoxysilane may further include at least one of a tetraalkoxysilane and a trialkoxysilane. In this case, a dense structure is likely to be formed in a light-absorbing layer formed using the light-absorbing composition owing to a siloxane bond.

In the light-absorbing composition, the alkoxysilane may further include a tetraalkoxysilane and a trialkoxysilane. In this case, a dense structure is likely to be formed more reliably in a light-absorbing layer formed using the light-absorbing composition owing to a siloxane bond.

In the light-absorbing composition, the at least one of a tetraalkoxysilane and a trialkoxysilane is not limited to a particular alkoxysilane. For example, in the light-absorbing composition, the alkoxysilane is at least one selected from the group consisting of tetramethoxysilane, tetraethoxysilane, methyltrimethoxysilane, methyltriethoxysilane, phenyltrimethoxysilane, phenyltriethoxysilane, 3-glycidoxypropyltrimethoxysilane, 3-glycidoxypropyltriethoxysilane, n-propyltriethoxysilane, n-propyltrimethoxysilane, hexyltriethoxysilane, hexyltrimethoxysilane, trifluoropropyltriethoxysilane, trifluoropropyltrimethoxysilane, vinyltriethoxysilane, vinyltrimethoxysilane, 3-aminopropyltriethoxysilane, 3-aminopropyltrimethoxysilane, 3-mercaptopropyltriethoxysilane, 3-mercaptopropyltrimethoxysilane, 3-isocyanatopropyltriethoxysilane, and 3-isocyanatopropyltrimethoxysilane.

A content of the dialkoxysilane in the alkoxysilane is not limited to a particular value. The content of the dialkoxysilane in the alkoxysilane is, for example, 15 to 48% on a mass basis when the mass of the alkoxysilane is calculated as the mass of its complete-hydrolysis-condensation product. In this case, the desired flexibility is likely to be imparted more reliably to a light-absorbing layer formed using the light-absorbing composition.

The content of the dialkoxysilane in the alkoxysilane is desirably 15 to 20% on a mass basis when the mass of the alkoxysilane is calculated as the mass of its complete-hydrolysis-condensation product. In this case, a light-absorbing layer formed using the light-absorbing composition is likely to exhibit high moisture-resistance. This is because a dense structure is likely to be formed owing to a siloxane bond and the light absorber is unlikely to form an aggregation in a high-humidity environment.

The light absorber is not limited to a particular light absorber as long as the light absorber can absorb light with a given wavelength. The light absorber may be formed, for example, of a phosphonic acid represented by the following formula (a) and copper ion.

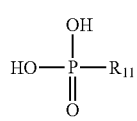

(a)

In the formula, $R_{11}$ is an alkyl group, an aryl group, a nitroaryl group, a hydroxyaryl group, or an aryl halide group in which at least one hydrogen atom of an aryl group is substituted by a halogen atom.

In the light-absorbing composition, the light absorber is formed, for example, by coordination of the phosphonic acid represented by the formula (a) to the copper ion. For example, fine particles containing at least the light absorber are present in the light-absorbing composition. In this case, the action of the alkoxysilane allows the fine particles to be dispersed in the light-absorbing composition without aggregation. The average particle diameter of the fine particles is, for example, 5 nm to 200 nm. When the average particle diameter of the fine particles is 5 nm or more, no particular ultramiconization process is required to obtain the fine particles, and the risk of structural destruction of the fine particles containing at least the light absorber is low. Additionally, the fine particles are well dispersed in the light-absorbing composition. When the average particle diameter of the fine particles is 200 nm or less, it is possible to reduce the influence of Mie scattering, increase the visible transmittance of an optical filter, and prevent deterioration of the properties such as contrast and haze of an image captured by an imaging apparatus. The average particle diameter of the fine particles is desirably 100 nm or less. In this case, the influence of Rayleigh scattering is reduced, and thus an optical filter produced using the light-absorbing composition has an increased transparency to visible light. The average particle diameter of the fine particles is more desirably 75 nm or less. In this case, an optical filter produced using the light-absorbing composition has especially high transparency to visible light. The average particle diameter of the fine particles can be measured by a dynamic light scattering method.

A phosphoric acid ester is used as a dispersant of some light absorbers. Thus, the light-absorbing composition may include a phosphoric acid ester. Meanwhile, in a light-absorbing layer formed using the light-absorbing composition, the compound derived from the alkoxysilane can impart higher moisture-resistance to the light-absorbing layer than the phosphoric acid ester and can allow the light absorber to be appropriately dispersed. The inclusion of the alkoxysilane in the light-absorbing composition can therefore reduce the amount of the phosphoric acid ester used. A reaction of the alkoxysilane around the light absorber with the dialkoxysilane in the process of forming the light-absorbing layer is likely to make the light-absorbing layer homogeneous and highly dense. The light-absorbing composition may not include the phosphoric acid ester.

The phosphoric acid ester is, for example, a phosphoric acid ester having a polyoxyalkyl group. The phosphoric acid ester having a polyoxyalkyl group is not limited to a particular phosphoric acid ester. The phosphoric acid ester having a polyoxyalkyl group is, for example, PLYSURF A208N (polyoxyethylene alkyl (C12, C13) ether phosphoric acid ester), PLYSURF A208F (polyoxyethylene alkyl (C8) ether phosphoric acid ester), PLYSURF A208B (polyoxyethylene lauryl ether phosphoric acid ester), PLYSURF A219B (polyoxyethylene lauryl ether phosphoric acid ester), PLYSURF AL (polyoxyethylene styrenated phenylether phosphoric acid ester), PLYSURF A212C (polyoxyethylene tridecyl ether phosphoric acid ester), or PLYSURF A215C (polyoxyethylene tridecyl ether phosphoric acid ester). All of these are products manufactured by DKS Co., Ltd. The phosphoric acid ester may be, for example, NIKKOL DDP-2 (polyoxyethylene alkyl ether phosphoric acid ester), NIKKOL DDP-4 (polyoxyethylene alkyl ether phosphoric acid ester), or NIKKOL DDP-6 (polyoxyethylene alkyl ether phosphoric acid ester). All of these are products manufactured by Nikko Chemicals Co., Ltd.

In the light-absorbing composition, the curable resin is not limited to a particular resin. The curable resin is, for example, a silicone resin. The silicone resin is a compound having a siloxane bond in its structure. In this case, since a hydrolysis-polycondensation product of the alkoxysilane also has a siloxane bond, the hydrolysis-polycondensation product of the alkoxysilane and the curable resin are compatible with each other in a light-absorbing layer formed of the light-absorbing composition.

The resin is desirably a silicone resin containing an aryl group such as a phenyl group. If the resin included in an optical filter is excessively hard (rigid), the likelihood of cure-shrinkage-induced cracking during the manufacturing process of the optical filter increases with increasing thickness of a layer including the resin. When the resin is the silicone resin containing an aryl group, the layer formed of the light-absorbing composition is likely to have high crack resistance. The silicone resin containing an aryl group has high compatibility with the phosphonic acid represented by the formula (a) and reduces the likelihood of aggregation of the light absorber. Specific examples of the silicone resin available as a matrix resin include KR-255, KR-300, KR-2621-1, KR-211, KR-311, KR-216, KR-212, KR-251, and KR-5230. All of these are silicone resins manufactured by Shin-Etsu Chemical Co., Ltd.

An exemplary method for preparing the light-absorbing composition will now be described with an example in which the light absorber is made of the above phosphonic acid and the copper ion.

For example, when the light-absorbing composition includes the phosphonic acid (aryl-based phosphonic acid) represented by the formula (a) in which $R_{11}$ is an aryl group, a nitroaryl group, a hydroxyaryl group, or an aryl halide group, a solution D is prepared in the following manner. A copper salt such as copper acetate monohydrate is added to a given solvent such as tetrahydrofuran (THF), and the mixture is stirred to prepare a solution A which is a copper salt solution. Next, the aryl-based phosphonic acid is added to a given solvent such as THF, and the mixture is stirred to prepare a solution B. When a plurality of phosphonic acids are used as the aryl-based phosphonic acid represented by the formula (a), the solution B may be prepared by adding each aryl-based phosphonic acid to a given solvent such as THF, stirring the mixture, and mixing a plurality of preliminary liquids each prepared to contain a different aryl-based phosphonic acid. For example, the alkoxysilane is added to prepare the solution B. The solution B is added to the solution A while the solution A is stirred, and the mixture is stirred for a given period of time. To the resulting solution is then added a given solvent such as toluene, and the mixture is stirred to obtain a solution C. Subsequently, the solution C is subjected to solvent removal under heating for a given period of time to obtain a solution D. This process removes the solvent such as THF and a component, such as acetic acid (boiling point: about 118° C.), generated by disassociation of the copper salt and yields a light absorber made of the phosphonic acid represented by the formula (a) and copper ion. The temperature at which the solution C is heated is determined based on the boiling point of the to-be-removed component disassociated from the copper salt. During the solvent removal, the solvent such as toluene (boiling point: about 110° C.) used to obtain the solution C is also evaporated. A certain amount of this solvent desirably remains in the light-absorbing composition. This is preferably taken into account in determining the amount of the solvent to be added and the time period of the solvent removal. To obtain the solution C, o-xylene (boiling point: about 144° C.) can be used instead of toluene. In this case, the amount of o-xylene to be added can be reduced to about one-fourth of the amount of toluene to be added, because the boiling point of o-xylene is higher than the boiling point of toluene.

When the light-absorbing composition includes the phosphonic acid (alkyl-based phosphonic acid) represented by the formula (a) in which $R_{11}$ is an alkyl group, a solution H is further prepared, for example, in the following manner. First, a copper salt such as copper acetate monohydrate is added to a given solvent such as tetrahydrofuran (THF), and the mixture is stirred to give a solution E which is a copper salt solution. A solution F is also prepared by adding the alkyl-based phosphonic acid to a given solvent such as THF and stirring the mixture. When a plurality of types of phosphonic acids are used as the alkyl-based phosphonic acid, the solution F may be prepared by adding each type of the alkyl-based phosphonic acid to a given solvent such as THF, stirring the mixture, and mixing a plurality of preliminary liquids each prepared to contain a different alkyl-based phosphonic acid. For example, the alkoxysilane is further added to prepare the solution F. The solution F is added to the solution E while the solution E is stirred, and the mixture is further stirred for a given period of time. To the resulting solution is then added a given solvent such as toluene, and the mixture is stirred to obtain a solution G. Subsequently, the solution G is subjected to solvent removal under heating for a given period of time to obtain a solution H. This process removes the solvent such as THF and the component, such as acetic acid, generated by disassociation of the copper salt. The temperature at which the solution G is heated is determined as in the case of the solution C. The solvent for obtaining the solution G is also determined as in the case of the solution C.

The light-absorbing composition can be prepared, for example, by mixing the solutions D and H in a given proportion, adding the alkoxysilane thereto, and, if necessary, adding the curable resin such as the silicone resin thereto. In this case, the dialkoxysilane may be added after the solutions D and H are mixed.

As shown in FIG. 1, an optical filter 1a includes a light-absorbing layer 10. The light-absorbing layer 10 includes a light absorber and a hydrolysis-condensation product of an alkoxysilane. The light-absorbing layer 10 is characterized by being flexible. For example, the light-absorbing layer 10 has an average Young's modulus of 2.00 GPa or less when a principal surface 10a of the light-absorbing layer 10 is measured using a nanoindenter by a nanoindentation technique (continuous stiffness measurement technique). The light-absorbing layer 10 may have an average Young's modulus of, for example, 0.10 to 2.00 GPa. Additionally, the light-absorbing layer 10 has an average hardness of 0.06 GPa or less. The light-absorbing layer 10 may have an average hardness of 0.005 to 0.06 GPa. As described above, the light-absorbing layer 10 has the desired flexibility while including a skeleton having a siloxane bond owing to the hydrolysis-condensation product of the alkoxysilane. For details of the nanoindentation technique (continuous stiffness measurement technique), WO 2019/044758 A1 and JP 2015-174270 A can be referred to.

The hydrolysis-condensation product of the alkoxysilane in the light-absorbing layer 10 includes, for example, a hydrolysis-condensation product of a dialkoxysilane. In this case, the light-absorbing layer 10 has the desired flexibility.

From another aspect, the light-absorbing layer 10 may be formed, for example, of a cured product of the above light-absorbing composition. In this case, the light-absorbing layer 10 is likely to have the desired flexibility.

The optical filter 1a satisfies, for example, the following requirements when a moisture resistance test is performed in which the environment of the optical filter 1a is kept at a temperature of 85° C. and a relative humidity of 85% for 1000 hours. The optical filter 1a satisfying the requirements exhibits good moisture-resistance. Regarding parameters, the term "amount of change" means the absolute value of a difference between values of a parameter before and after the moisture resistance test. The term "amount of change in average transmittance" means the absolute value of a difference between the average transmittance before the moisture resistance test and the average transmittance after the moisture resistance test in a given wavelength range. The term "amount of change in maximum transmittance" means the absolute value of a difference between the maximum transmittance before the moisture resistance test and the maximum transmittance after the moisture resistance test in a given wavelength range. The unit of the amount of change, expressed in percentage, of each transmittance-related parameter is referred to as "point".

(i) An amount of change $\Delta T_{450-600}$ in average transmittance between wavelengths of 450 nm to 600 nm is 3 points or less. $\Delta T_{450-600}$ is desirably 1 point or less and is more desirably 0.5 point or less.

(ii) An amount of change Δλuvc in UV cut-off wavelength is 5 nm or less, and an amount of change Δλirc in IR cut-off wavelength is 5 nm or less. The UV cut-off wavelength refers to a wavelength at which the transmittance is 50% and which lies in the wavelength range of 350 nm to 450 nm. The IR cut-off wavelength refers to a wavelength at which the transmittance is 50% and which lies in the wavelength range of 600 nm to 800 nm.

(iii) An amount of change Δλirc-uvc in value determined by subtracting the UV cut-off wavelength from the IR cut-off wavelength is 10 nm or less.

(iv) An amount of change $\Delta T_{max300-350}$ in maximum transmittance between wavelengths of 300 to 350 nm is 1 point or less. $\Delta T_{max300-350}$ is desirably 0.5 point or less.

(v) An amount of change $\Delta T_{max300-360}$ in maximum transmittance between wavelengths of 300 to 360 nm is 1 point or less. $\Delta T_{max300-360}$ is desirably 0.5 point or less.

(vi) An amount of change $\Delta T_{AVE700-750}$ in average transmittance between wavelengths of 700 to 750 nm is 3 points or less. $\Delta T_{AVE700-750}$ is desirably 1 point or less.

(vii) An amount of change $\Delta T_{max750\text{-}1080}$ in maximum transmittance between wavelengths of 750 to 1080 nm is 3 points or less. $\Delta T_{AVE750\text{-}1080}$ is desirably 1 point or less.

(viii) An amount of change $\Delta T_{max800\text{-}950}$ in maximum transmittance between wavelengths of 800 to 950 nm, an amount of change $\Delta T_{max800\text{-}1000}$ in maximum transmittance between wavelengths of 800 to 1000 nm, an amount of change $\Delta T_{max800\text{-}1050}$ in maximum transmittance between wavelengths of 800 to 1050 nm, an amount of change $\Delta T_{max800\text{-}1100}$ in maximum transmittance between wavelengths of 800 to 1100 nm, an amount of change $\Delta T_{max800\text{-}1150}$ in maximum transmittance between wavelengths of 800 to 1150 nm, and an amount of change $\Delta T_{max800\text{-}1200}$ in maximum transmittance between wavelengths of 800 to 1200 nm are each 3 points or less. $\Delta T_{max800\text{-}950}$, $\Delta T_{max800\text{-}1000}$, $\Delta T_{max800\text{-}1050}$, $\Delta T_{max800\text{-}1100}$, $\Delta T_{max800\text{-}1150}$, and $\Delta T_{max800\text{-}1200}$ are each desirably 1 point or less.

As shown in FIG. 1, the optical filter 1a is, for example, composed only of the light-absorbing layer 10. In this case, the optical filter 1a is, for example, used independently of an image sensing device or an optical component. The optical filter 1a may be integrated with an image sensing device or an optical component. Alternatively, the optical filter 1a may be configured by applying the above light-absorbing composition to an image sensing device or an optical component and curing the light-absorbing composition.

The optical filter 1a can be manufactured, for example, by peeling the light-absorbing layer 10 formed on a substrate from the substrate. In this case, the material of the substrate may be glass, resin, or a metal. A surface of the substrate may be subjected to surface treatment such as coating using a fluorine-including compound.

Figure 2:
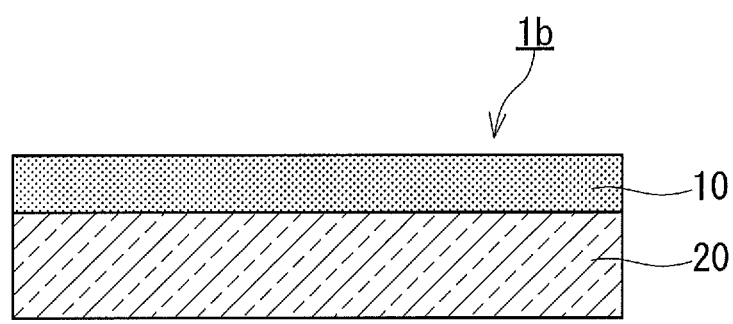
FIG. 2 is a cross-sectional view showing another example of the optical filter according to the present invention.
Figure 3:
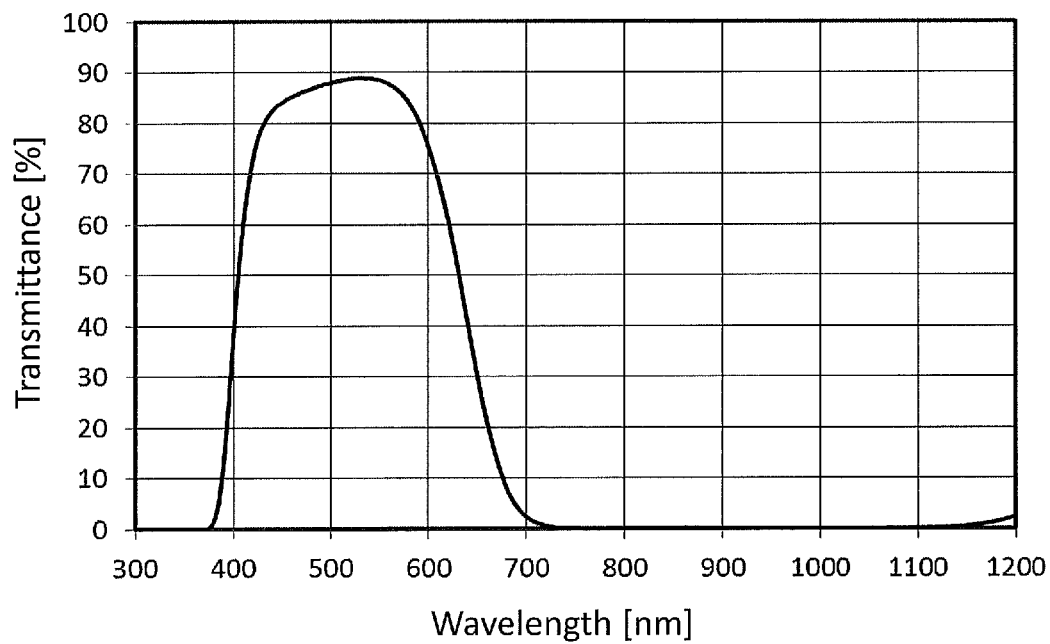
FIG. 3 shows a transmittance spectrum of an optical filter according to Example 1.
Figure 4:
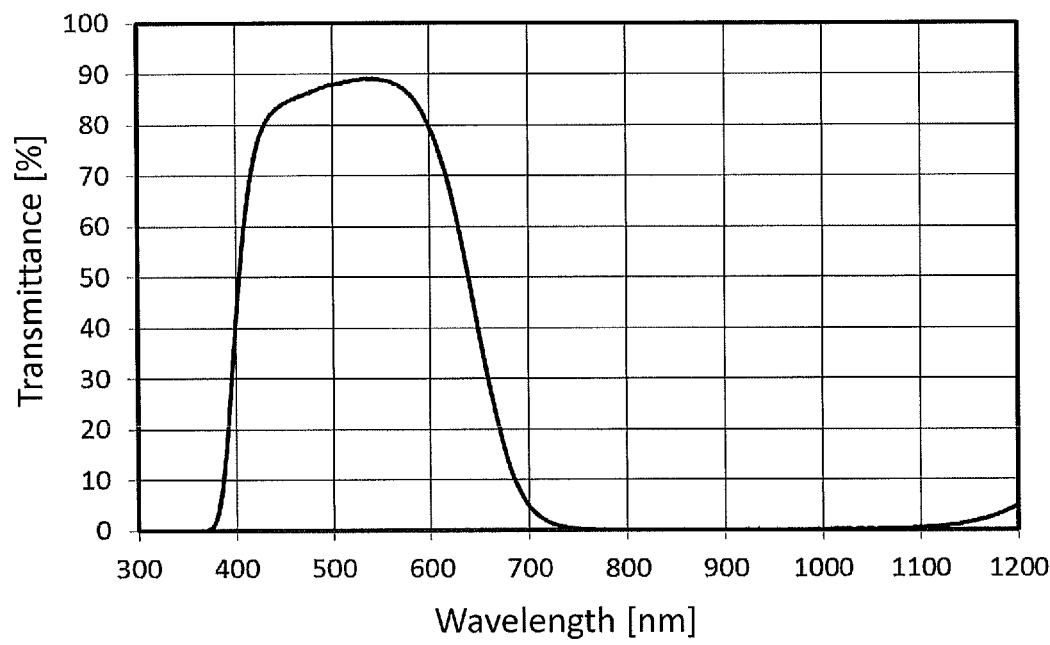
FIG. 4 shows a transmittance spectrum of an optical filter according to Example 2.
Figure 5:
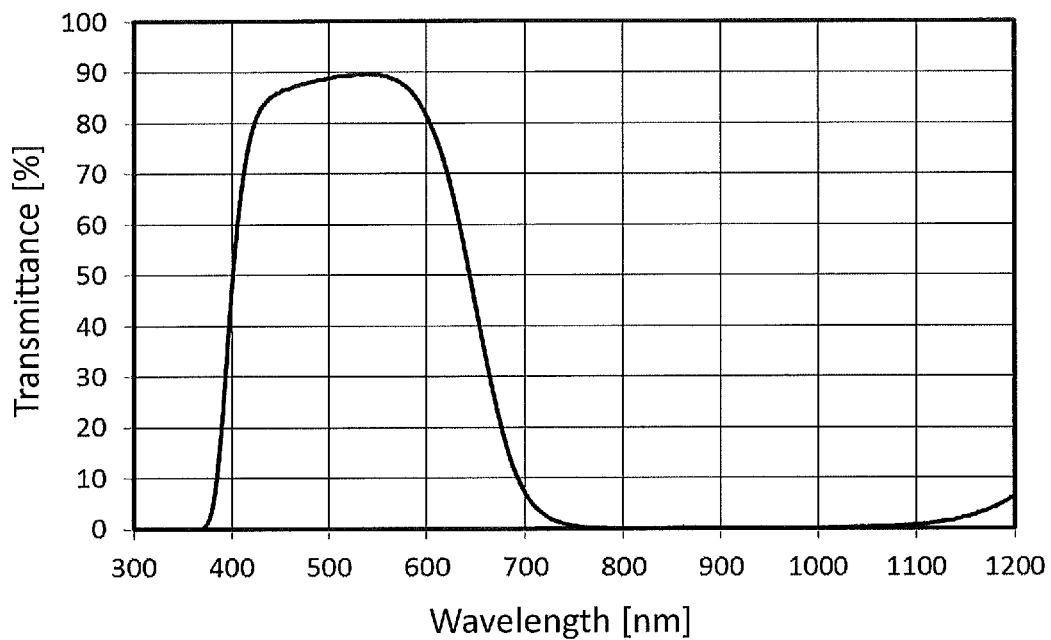
FIG. 5 shows a transmittance spectrum of an optical filter according to Example 3.
Figure 6:
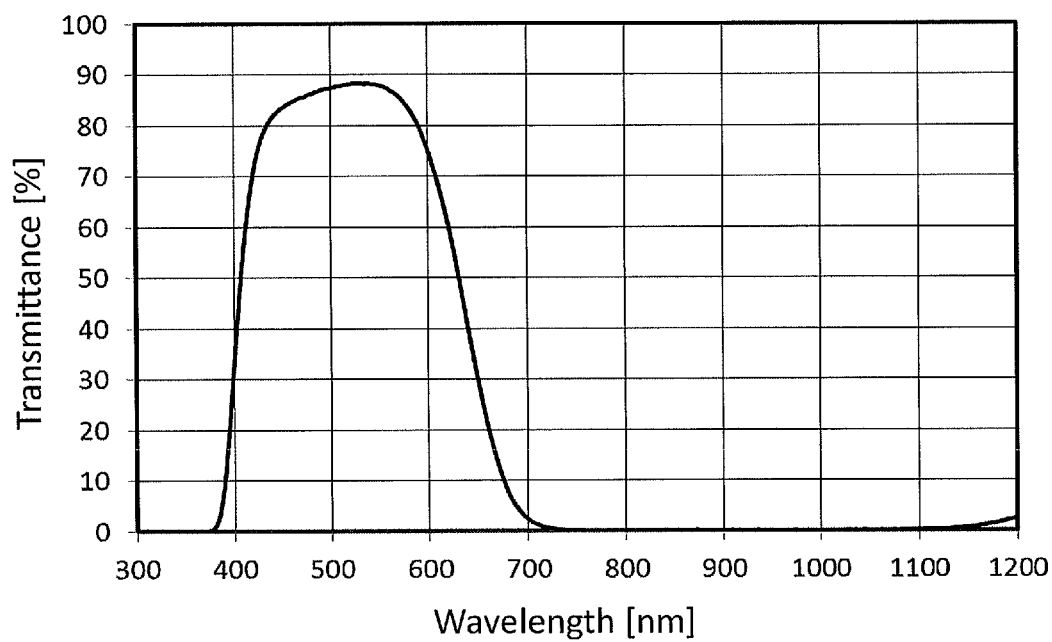
FIG. 6 shows a transmittance spectrum of an optical filter according to Comparative Example 1.

The optical filter 1a may be modified, for example, to an optical filter 1b shown in FIG. 2. The optical filter 1b is configured in the same manner as the optical filter 1a, unless otherwise described. The components of the optical filter 1b that are the same as or correspond to the components of the optical filter 1a are denoted by the same reference characters, and detailed descriptions of such components are omitted. The description given for the optical filter 1a can apply to the optical filter 1b, unless there is technical inconsistency.

As shown in FIG. 2, the optical filter 1b includes the light-absorbing layer 10 and a transparent dielectric substrate 20. The light-absorbing layer 10 is arranged in parallel to one principal surface of the transparent dielectric substrate 20. The light-absorbing layer 10 may be, for example, in contact with one principal surface of the transparent dielectric substrate 20. In this case, for example, the light-absorbing layer 10 is formed by applying the above light-absorbing composition to the one principal surface of the transparent dielectric substrate 20 and curing the light-absorbing composition.

The type of the transparent dielectric substrate 20 is not limited to a particular type. The transparent dielectric substrate 20 may have the ability to absorb light in the infrared region. The transparent dielectric substrate 20 may have, for example, an average spectral transmittance of 90% or more between wavelengths of 350 nm to 900 nm. The material of the transparent dielectric substrate 20 is not limited to a particular material, and is, for example, a certain type of a glass or a resin. When the material of the transparent dielectric substrate 20 is a glass, the transparent dielectric substrate 20 is made of, for example, a transparent glass being a silicate glass such as soda-lime glass or borosilicate glass or an infrared cut glass. The infrared cut glass is, for example, a phosphate glass or fluorophosphate glass containing CuO.

When the material of the transparent dielectric substrate 20 is a resin, the resin is, for example, a cyclic olefin resin such as a norbornene resin, a polyarylate resin, an acrylic resin, a modified acrylic resin, a polyimide resin, a polyetherimide resin, a polysulfone resin, a polyethersulfone resin, a polycarbonate resin, or a silicone resin.

The optical filters 1a and 1b may be modified to further include another functional film such as an infrared-reflecting film.

EXAMPLES

The present invention will be described in more detail by examples. The present invention is not limited to the examples given below.

Example 1

(Production of Aryl-Based Copper Phosphonate)

4.500 g of copper acetate monohydrate and 240 g of tetrahydrofuran (THF) were mixed, and the mixture was stirred for 3 hours to obtain a copper acetate solution. To the obtained copper acetate solution was then added 1.646 g of PLYSURF A208N (manufactured by DKS Co., Ltd.) which is a phosphoric acid ester compound, and the mixture was stirred for 30 minutes to obtain a solution A. 40 g of THF was added to 0.706 g of phenylphosphonic acid, and the mixture was stirred for 30 minutes to obtain a solution B-1. 40 g of THF was added to 4.230 g of 4-bromophenylphosphonic acid, and the mixture was stirred for 30 minutes to obtain a solution B-2. Next, the solutions B-1 and B-2 were mixed, and the mixture was stirred for 1 minute. To the mixture were added 8.664 g of methyltriethoxysilane (MTES) (manufactured by Shin-Etsu Chemical Co., Ltd., product name: KBE-13) and 2.830 g of tetraethoxysilane (TEOS) (manufactured by KISHIDA CHEMICAL Co., Ltd., special grade), and the mixture was further stirred for 1 minute to obtain a solution B. The solution B was added to the solution A while the solution A was stirred, and the mixture was stirred at room temperature for 1 minute. To the resulting solution was then added 140 g of toluene, and the mixture was stirred at room temperature for 1 minute to obtain a solution C. This solution C was placed in a flask and subjected to solvent removal using a rotary evaporator (manufactured by Tokyo Rikakikai Co., Ltd., product code: N-1110SF) under heating by means of an oil bath (manufactured by Tokyo Rikakikai Co., Ltd., product code: OSB-2100). The temperature of the oil bath was controlled to 105° C. A solution D according to Example 1 which had been subjected to the solvent removal was then collected from the flask. The solvent removal was performed so that the solvent would not be removed completely through the solvent removal and the viscosity would be reduced to some degree. The solution D which is a dispersion liquid of an aryl-based copper phosphonate (UV-IR absorber) was thus obtained.

(Production of Alkyl-Based Copper Phosphonate)

4.500 g of copper acetate monohydrate and 240 g of THF were mixed, and the mixture was stirred for 3 hours to obtain a copper acetate solution. To the obtained copper acetate solution was then added 2.572 g of PLYSURF A208N which is a phosphoric acid ester compound, and the mixture was stirred for 30 minutes to obtain a solution E. 40 g of THF was added to 2.886 g of n-butylphosphonic acid, and the mixture was stirred for 30 minutes to obtain a solution F. The solution F was added to the solution E while the solution E was stirred, and the mixture was stirred at room temperature for 1 minute. To the resulting solution was then added 100 g of toluene, and the mixture was stirred at room temperature for 1 minute to obtain a solution G. This solution G was placed in a flask and subjected to solvent removal using a rotary evaporator under heating by means of an oil bath. The temperature of the oil bath was controlled to 105° C. A solution H according to Example 1 which had been subjected to the solvent removal was then collected from the flask. The solvent removal was performed so that the solvent would not be removed completely through the solvent removal and the viscosity of the solution H would be reduced to some degree. The solution H which is a dispersion liquid of a copper butylphosphonate (IR absorber) was thus obtained.

(Preparation of Light-Absorbing Composition)

To the solution D was added 12.57 g of a silicone resin (manufactured by Shin-Etsu Chemical Co., Ltd., product name: KR-300), and the mixture was stirred for 30 minutes to obtain a solution I. The solution H in an amount of 40 mass % of the total amount thereof was added to the solution I, to which 10.840 g of methyltriethoxysilane (MTES) (manufactured by Shin-Etsu Chemical Co., Ltd., product name: KBE-13), 5.660 g of tetraethoxysilane (TEOS) (manufactured by KISHIDA CHEMICAL Co., Ltd., special grade), and 4.896 g of dimethyldiethoxysilane (DMDES) (manufactured by Shin-Etsu Chemical Co., Ltd., product name: KBE-22), which are alkoxysilanes, were further added. The mixture was stirred for 30 minutes to obtain a light-absorbing composition according to Example 1. The light-absorbing composition according to Example 1 was prepared so that, assuming that complete-hydrolysis-condensation products of the alkoxysilanes were able to be obtained, the content of a silane compound derived from MTES would be 60.0%, the content of a silane compound derived from TEOS would be 20.0%, and the content of a silane compound derived from DMDES would be 20.0% on a mass basis in a total of the complete-hydrolysis-condensation products of the alkoxysilanes. This calculation was performed assuming that the ratio of the amount of the silane compound (solids) derived from MTES and present in the complete-hydrolysis-condensation products of the alkoxysilanes to the amount of MTES added is 37.64% on a mass basis, the ratio of the amount of the silane compound (solids) derived from TEOS and present in the complete-hydrolysis-condensation products of the alkoxysilanes to the amount of TEOS added is 28.84% on a mass basis, and the ratio of the amount of the silane compound (solids) derived from DMDES and present in the complete-hydrolysis-condensation products of the alkoxysilanes to the amount of DMDES added is 50.01% on a mass basis. Calculations were done in Examples 2 and 3 and Comparative Example 1 on the basis of the same assumption. Table 2 shows a relation between the amounts of the alkoxysilanes added to prepare the solution D and the light-absorbing composition.

(Production of Optical Filter)

An amount of 0.1 g of an anti-smudge surface coating agent (manufactured by DAIKIN INDUSTRIES, LTD., product name: OPTOOL DSX, concentration of active ingredient: 20 mass %) and 19.9 g of a hydrofluoroether-containing solution (manufactured by 3M Company, product name: Novec 7100) were mixed and stirred for 5 minutes to prepare a fluorine treatment agent (concentration of active ingredient: 0.1 mass %). This fluorine treatment agent was poured over and applied to a round borosilicate glass (manufactured by SCHOTT AG, product name: D 263 T eco) having a diameter of 200 mm and a thickness of 0.7 mm. After that, the glass substrate was left at room temperature for 24 hours to dry the coated film of the fluorine treatment agent. The glass surface was then wiped lightly with a dust-free cloth impregnated with Novec 7100 to remove an excess of the fluorine treatment agent. A fluorine-treated substrate was thus produced.

The light-absorbing composition according to Example 1 was applied to the fluorine-treated substrate using a dispenser. A stainless steel casting frame (inner dimensions: about 100 mm square) was used for the application so that the coated film would maintain a sufficient thickness. The substrate to which the light-absorbing composition was applied was left to stand still for a given period of time to sufficiently proceed reaction of the components of the light-absorbing composition. Then, the substrate was gradually heated from room temperature to slowly evaporate the solvent and cure the light-absorbing composition. The highest temperature reached in the heating was controlled to 85° C. Furthermore, the substrate was placed in an environment of a temperature of 85° C. and a relative humidity of 85% for about 2 hours to promote hydrolysis reaction of the alkoxysilanes to obtain a light-absorbing film. The thus-obtained light-absorbing film was removed from the substrate by pulling up its edge. An optical filter according to Example 1 having a size of about 100 mm square in plan view was thus obtained.

(Cutting of Optical Filter)

The optical filter according to Example 1 was cut into strips using a rotary cutter (manufactured by OLFA CORPORATION) having a 28-mm-diameter round blade. Specifically, the optical filter was cut by applying a load of about 30 N to the optical filter along four straight lines located parallel to one side of the optical filter at 20 mm intervals. The strip-shaped samples obtained were observed using a metallurgical microscope at 50-fold magnification. As a result, it was confirmed that breakage such as split or fracture did not occur around sections of the samples and the optical filter according to Example 1 was cut well.

Example 2

The solution D which is a dispersion liquid of an aryl-based copper phosphonate (UV-IR absorber) and the solution H which is a dispersion liquid of a copper butylphosphonate (IR absorber) were obtained in the same manner as in Example 1. Next, to the solution D was added 12.57 g of a silicone resin (manufactured by Shin-Etsu Chemical Co., Ltd., product name: KR-300), and the mixture was stirred for 30 minutes to obtain the solution I. The solution H in an amount of 40 mass % of the total amount thereof was added to the solution I, to which 5.420 g of methyltriethoxysilane (MTES) (manufactured by Shin-Etsu Chemical Co., Ltd., product name: KBE-13), 2.830 g of tetraethoxysilane (TEOS) (manufactured by KISHIDA CHEMICAL Co., Ltd., special grade), and 2.448 g of dimethyldiethoxysilane (DMDES) (manufactured by Shin-Etsu Chemical Co., Ltd., product name: KBE-22), which are alkoxysilanes, were further added. The mixture was stirred for 30 minutes to obtain a light-absorbing composition according to Example 2. The light-absorbing composition according to Example 2 was prepared so that, assuming that complete-hydrolysis-condensation products of the alkoxysilanes were able to be obtained, the content of a silane compound derived from MTES would be 65.0%, the content of a silane compound derived from TEOS would be 20.0%, and the content of a silane compound derived from DMDES would be 15.0% on a mass basis in a total of the complete-hydrolysis-condensation products of the alkoxysilanes.

An optical filter according to Example 2 was produced in the same manner as in Example 1, except that the light-absorbing composition according to Example 2 was used instead of the light-absorbing composition according to Example 1. Additionally, the optical filter according to Example 2 was cut into strips in the same manner as for the optical filter according to Example 1. The strip-shaped samples obtained were observed using a metallurgical microscope at 50-fold magnification. As a result, it was confirmed that breakage such as split or fracture did not occur around sections of the samples and the optical filter according to Example 2 was cut well.

Example 3

The solution D which is a dispersion liquid of an aryl-based copper phosphonate (UV-IR absorber) and the solution H which is a dispersion liquid of a copper butylphosphonate (IR absorber) were obtained in the same manner as in Example 1. Next, to the solution D was added 12.57 g of a silicone resin (manufactured by Shin-Etsu Chemical Co., Ltd., product name: KR-300), and the mixture was stirred for 30 minutes to obtain the solution I. The solution H in an amount of 40 mass % of the total amount thereof was added to the solution I, to which 7.344 g of dimethyldiethoxysilane (DMDES) (manufactured by Shin-Etsu Chemical Co., Ltd., product name: KBE-22), which is an alkoxysilane, was further added. The mixture was stirred for 30 minutes to obtain a light-absorbing composition according to Example 3. Methyltriethoxysilane (MTES) and tetraethoxysilane (TEOS) were not added to the mixture of the solutions I and H to prepare the light-absorbing composition according to Example 3. The light-absorbing composition according to Example 3 was prepared so that, assuming that complete-hydrolysis-condensation products of the alkoxysilanes were able to be obtained, the content of a silane compound derived from MTES would be 42.1%, the content of a silane compound derived from TEOS would be 10.5%, and the content of a silane compound derived from DMDES would be 47.4% on a mass basis in a total of the complete-hydrolysis-condensation products of the alkoxysilanes.

An optical filter according to Example 3 was produced in the same manner as in Example 1, except that the light-absorbing composition according to Example 3 was used instead of the light-absorbing composition according to Example 1. Additionally, the optical filter according to Example 3 was cut into strips in the same manner as for the optical filter according to Example 1. The strip-shaped samples obtained were observed using a metallurgical microscope at 50-fold magnification. As a result, it was confirmed that breakage such as split or fracture did not occur around sections of the samples and the optical filter according to Example 3 was cut well.

Comparative Example 1

The solution D which is a dispersion liquid of an aryl-based copper phosphonate (UV-IR absorber) and the solution H which is a dispersion liquid of a copper butylphosphonate (IR absorber) were obtained in the same manner as in Example 1. Next, to the solution D was added 12.57 g of a silicone resin (manufactured by Shin-Etsu Chemical Co., Ltd., product name: KR-300), and the mixture was stirred for 30 minutes to obtain the solution I. The solution H in an amount of 40 mass % of the total amount thereof was added to the solution I, and the mixture was further stirred for 30 minutes to obtain a light-absorbing composition according to Comparative Example 1. No alkoxysilanes were added to the mixture of the solutions I and H to prepare the light-absorbing composition according to Comparative Example 1.

An optical filter according to Comparative Example 1 was produced in the same manner as in Example 1, except that the light-absorbing composition according to Comparative Example 1 was used instead of the light-absorbing composition according to Example 1. Additionally, an attempt was made to cut the optical filter according to Comparative Example 1 into strips in the same manner as for the optical filter according to Example 1; however, a lot of cracks were formed around four straight lines located parallel to one side of the optical filter at 20 mm intervals. The optical filter according to Comparative Example 1 was unable to be cut well, and strip-shaped samples were unable to be obtained.

<Transmittance Spectrum Measurement>

Each optical filter was measured for a transmittance spectrum at an incident angle of 0° using an ultraviolet/visible/near-infrared spectrophotometer (manufactured by JASCO Corporation, product name: V-670). FIGS. 3, 4, 5, and 6 show the transmittance spectra of the optical filters according to Examples 1 to 3 and Comparative Example 1, respectively. Table 1 shows transmittance-related properties obtained from the transmittance spectra shown in FIGS. 3 to 6.

<Thickness Measurement>

The thickness of each optical filter was measured using a laser displacement meter (manufactured by Keyence Corporation, product name: LK-11008) by measuring the distance to a surface of the optical filter. Table 1 shows the results.

<Young's Modulus and Hardness>

Surface properties of each optical filter were measured using a nanoindenter (manufactured by MTS Systems Corporation, product name: Nano Indenter XP) by the nanoindentation technique (continuous stiffness measurement technique). The measurement was performed in air and at a room temperature of about 23° C. using a triangular pyramid indenter made of diamond as an indenter. Values of hardness in the indentation depth range of 5 to 10 μm in a hardness-indentation depth diagram obtained by this measurement were averaged to determine the average hardness of the surface of each optical filter. Values of Young's moduli in the indentation depth range of 5 to 10 μm in a Young's modulus-indentation depth diagram obtained by this measurement were averaged to determine the average Young's modulus of each optical filter. The Poisson's ratio of each optical filter was defined as 0.4 on the basis of the fact that the main component of the optical filter is a silicone resin. Table 3 shows the results. For Examples, the average Young's moduli were 0.87 to 1.6 GPa, and the average hardnesses were 0.020 to 0.048 GPa. On the other hand, for Comparative Example, the average Young's modulus was 2.6 GPa, and the hardness was 0.11 GPa; these demonstrate inferior flexibility of the optical filter.

<Haze Measurement>

Hazes of the optical filters according to Examples 1 to 3 and Comparative Example 1 were measured using a haze meter (manufactured by MURAKAMI COLOR RESEARCH LABORATORY Co., Ltd., product name: HM-65L2) according to Japanese Industrial Standards (JIS) K 7136. Table 3 shows the results.

<Moisture Resistance Test>

Figure 7:
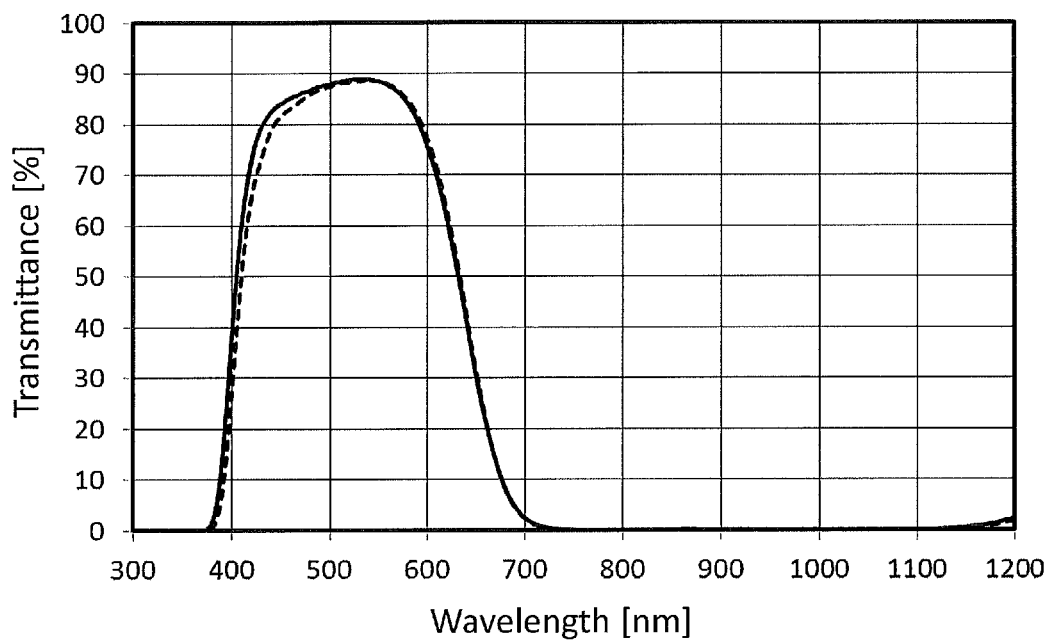
FIG. 7 shows transmittance spectra of the optical filter according to Example 1 before and after a moisture resistance test.
Figure 8:
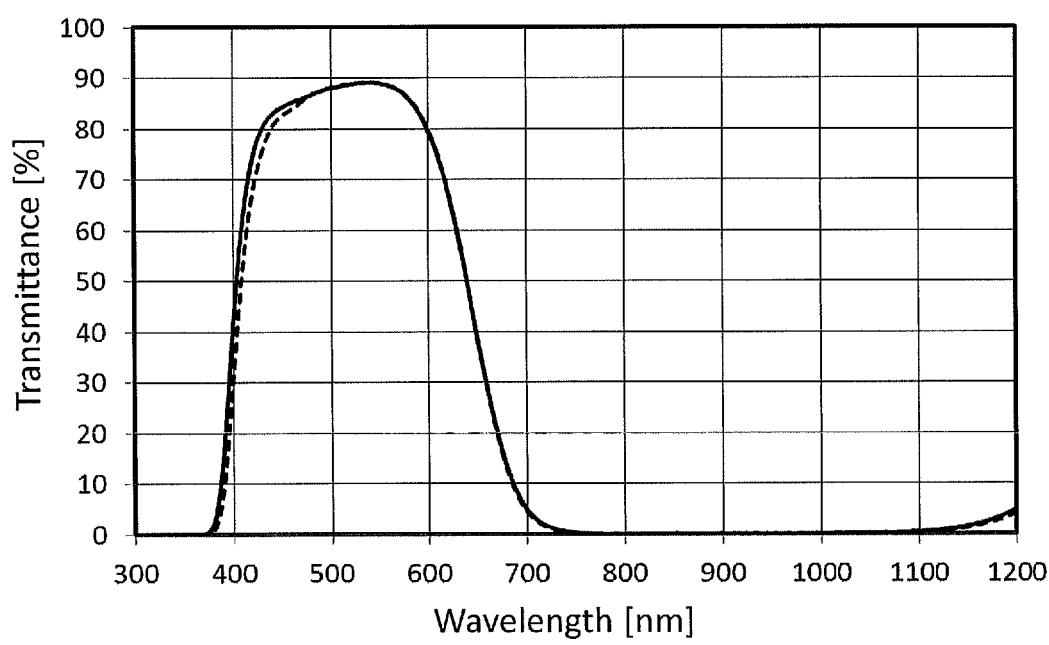
FIG. 8 shows transmittance spectra of the optical filter according to Example 2 before and after a moisture resistance test.

A moisture resistance test was performed in which the optical filters according to Examples 1 to 3 were stored for 1000 hours in a thermo-hygrostat (manufactured by Tokyo Rikakikai Co., Ltd., KCL-2000A) set at a temperature of 85° C. and a relative humidity of 85%. Each optical filter according to Examples 1 and 2 was measured after the moisture resistance test for a transmittance spectrum at an incident angle of 0° using an ultraviolet/visible/near-infrared spectrophotometer (manufactured by JASCO Corporation, product name: V-670). FIGS. 7 and 8 show the results. In FIGS. 7 and 8, solid lines represent the transmittance spectra of the optical filters before the moisture resistance test, while dotted lines represent the transmittance spectra of the optical filters after the moisture resistance test. Table 4 shows parameter values obtained from these transmittance spectra. The optical filter according to Example 3 after the moisture resistance test was white and cloudy and was completely impervious to light.

As shown in Table 3, it is indicated that the optical filters according to Examples 1 to 3 have higher flexibility than that of the optical filter according to Comparative Example 1. As shown in Table 4, the optical filters according to Examples 1 and 2 satisfy the above requirements (i) to (viii), which indicates the optical filters according to Examples 1 and 2 have good moisture-resistance.

The light-absorbing film of the optical filter according to each embodiment of the present invention has a low Young's modulus and a high flexibility. Because of this, after produced on a flat substrate, the light-absorbing film is peeled off from the substrate and laminated along a surface of a base, such as a lens, a bent filter, a highly flexible resin filter, or another optical element, having any curved surface or a highly flexible flat surface, so that the light-absorbing film can be laminated at a uniform thickness on the curved surface to form an optical element or optical filter having a light-absorbing ability.

For mobile communication devices such as smartphones of recent years, highly flexible bases typified by organic EL displays are increasingly used. The light-absorbing film according to each embodiment of the present invention easily deforms to fit such a flexible display or panel serving as a base, and is thus easily applicable to these fields.

As very delicate control is required, it is difficult to form a film having a uniform thickness on a curved surface by a common application method such as spin coating or dip coating. On the other hand, the above technique is very effective in that the light-absorbing film can be relatively easily formed on a curved surface at a uniform thickness.

An adhesive may be used to bond the light-absorbing film and a curved surface. The film having undergone pre-baked may be laminated along, for example, a curved surface of a base and subsequently subjected to a heat treatment or a heat and humidification treatment. In the latter case, the pre-baking temperature is desirably 60° C. or lower, and the temperature for the final heating and humidification is desirably 80° C. or higher.

Moreover, a substrate having a surface on which a wire rod made of glass fibers, carbon fibers, or cellulose nanofibers was arranged (for example, in a grid pattern) may be used as the substrate for production of the light-absorbing film. In this case, after formed on the substrate, the light-absorbing film is peeled off together with the wire rod. The light-absorbing film in or on which the wire rod is arranged can thereby be obtained. Since the wire rod imparts adequate mechanical stiffness to the light-absorbing film, the light-absorbing film having a good harmonization of flexibility and stiffness can be produced.

Furthermore, the light-absorbing film may be formed to have a special surface condition (e.g., a lens-like shape) in accordance with a final substrate shape by forming a coating film on a flat substrate and deforming the substrate under heating or a heating and humidification treatment. Light-absorbing filters having various surface conditions (flat surfaces and curved surfaces) can be produced by deforming or curing the light-absorbing film in accordance with a desired substrate shape.

The light-absorbing film of each embodiment of the present invention has a high impact-resistance. Therefore, the light-absorbing film of each embodiment of the present invention has an advantage in that the film is less likely to be limited in terms of its usage environment. The light-absorbing film of each embodiment of the present invention can be used effectively as a part of, for example, wearable devices, especially camera modules mounted in wearable cameras and action cameras, exposed to a long-term vibration or a high impact, optical sensors, and various optical systems.

TABLE 1

| | Optical properties | | | | | | | |
|---|---|---|---|---|---|---|---|---|
| | 1<br>Maximum transmittance between 300 to 350 nm [%] | 2<br>Maximum transmittance between 300 to 360 nm [%] | 3<br>UV cut-off wavelength [nm] | 4<br>Average transmittance between 450 to 600 nm [%] | 5<br>IR cut-off wavelength [nm] | 6<br>Average transmittance between 700 to 750 nm [%] | 7<br>Maximum transmittance between 750 to 1080 nm [%] | 8<br>Maximum transmittance between 800 to 950 nm [%] |
| Ex. 1 | 0.05 | 0.05 | 405 | 86.32 | 631 | 0.70 | 0.27 | 0.27 |
| Ex. 2 | 0.04 | 0.04 | 404 | 86.93 | 638 | 1.64 | 0.33 | 0.13 |
| Ex. 3 | 0.04 | 0.04 | 401 | 88.03 | 643 | 2.63 | 0.61 | 0.36 |
| Comp. Ex. 1 | 0.07 | 0.07 | 407 | 85.76 | 630 | 0.68 | 0.22 | 0.22 |

| | Optical properties | | | | | |
|---|---|---|---|---|---|---|
| | 9<br>Maximum transmittance between 800 | 10<br>Maximum transmittance between 800 | 11<br>Maximum transmittance between 800 | 12<br>Maximum transmittance between 800 | 13<br>Maximum transmittance between 800 | 14<br>Difference between IR cut-off wavelength and UV cut-off |

TABLE 1-continued

|  | to 1000 nm [%] | to 1050 nm [%] | to 1100 nm [%] | to 1150 nm [%] | to 1200 nm [%] | wavelength [nm] | Thickness [μm] |
| --- | --- | --- | --- | --- | --- | --- | --- |
| Ex. 1 | 0.27 | 0.27 | 0.27 | 0.58 | 2.41 | 225 | 236 |
| Ex. 2 | 0.13 | 0.25 | 0.48 | 1.59 | 4.90 | 235 | 197 |
| Ex. 3 | 0.36 | 0.36 | 0.81 | 2.30 | 6.44 | 242 | 146 |
| Comp. Ex. 1 | 0.22 | 0.22 | 0.22 | 0.62 | 2.65 | 223 | 201 |

TABLE 2

|  |  | Amount added [g] | | | | Amount of solids [g] | | |
| --- | --- | --- | --- | --- | --- | --- | --- | --- |
|  |  | Tetra-alkoxysilane TEOS | Tri-alkoxysilane MTES | Di-alkoxysilane DMDES | Whole silane monomers | Tetra-alkoxysilane TEOS | Tri-alkoxysilane MTES | |
| Ex. 1 | Preparation of aryl-based copper phosphonate | 2.830 | 8.664 | 0.000 | 11.494 | 0.816 | 3.261 | |
|  | Final preparation of light-absorbing composition | 5.660 | 10.840 | 4.896 | 21.396 | 1.632 | 4.080 | |
|  | Sum | 8.490 | 19.504 | 4.896 | 32.890 | 2.449 | 7.341 | |
| Ex. 2 | Preparation of aryl-based copper phosphonate | 2.830 | 8.664 | 0.000 | 11.494 | 0.816 | 3.261 | |
|  | Final preparation of light-absorbing composition | 2.830 | 5.420 | 2.448 | 10.698 | 0.816 | 2.040 | |
|  | Sum | 5.660 | 14.084 | 2.448 | 22.192 | 1.632 | 5.301 | |
| Ex. 3 | Preparation of aryl-based copper phosphonate | 2.830 | 8.664 | 0.000 | 11.494 | 0.816 | 3.261 | |
|  | Final preparation of light-absorbing composition | 0.000 | 0.000 | 7.344 | 7.344 | 0.000 | 0.000 | |
|  | Sum | 2.830 | 8.664 | 7.344 | 18.838 | 0.816 | 3.261 | |
| Comp. Ex. 1 | Preparation of aryl-based copper phosphonate | 2.830 | 8.664 | 0.000 | 11.494 | 0.816 | 3.261 | |

|  |  | Amount of solids [g] | | Ratio of solids | | | |
| --- | --- | --- | --- | --- | --- | --- | --- |
|  |  | Di-alkoxysilane DMDES | Whole silane monomers | Tetra-alkoxysilane TEOS | Tri-alkoxysilane MTES | Di-alkoxysilane DMDES | Whole silane monomers |
| Ex. 1 | Preparation of aryl-based copper phosphonate | 0.000 | 4.077 | 6.7% | 26.6% | 0.0% | 33.3% |
|  | Final preparation of light-absorbing composition | 2.448 | 8.161 | 13.3% | 33.3% | 20.0% | 66.7% |
|  | Sum | 2.448 | 12.238 | 20.0% | 60.0% | 20.0% | 100.0% |
| Ex. 2 | Preparation of aryl-based copper phosphonate | 0.000 | 4.077 | 10.0% | 40.0% | 0.0% | 50.0% |
|  | Final preparation of light-absorbing composition | 1.224 | 4.081 | 10.0% | 25.0% | 15.0% | 50.0% |
|  | Sum | 1.224 | 8.158 | 20.0% | 65.0% | 15.0% | 100.0% |
| Ex. 3 | Preparation of aryl-based copper phosphonate | 0.000 | 4.077 | 10.5% | 42.1% | 0.0% | 52.6% |
|  | Final preparation of light-absorbing composition | 3.673 | 3.673 | 0.0% | 0.0% | 47.4% | 47.4% |
|  | Sum | 3.673 | 7.750 | 10.5% | 42.1% | 47.4% | 100.0% |
| Comp. Ex. 1 | Preparation of aryl-based copper phosphonate | 0.000 | 4.077 | 20.0% | 80.0% | 0.0% | 100.0% |

TABLE 3

|  | Average hardness [GPa] | Average Young's modulus [GPa] | Haze |
|---|---|---|---|
| Example 1 | 0.020 | 0.87 | 0.34 |
| Example 2 | 0.048 | 1.6 | 0.31 |
| Example 3 | 0.028 | 1.1 | 0.13 |
| Comparative Example 1 | 0.11 | 2.6 | 0.7 |

TABLE 4

| | | Optical properties | | | | | | |
|---|---|---|---|---|---|---|---|---|
| | | 1 Maximum transmittance between 300 to 350 nm [%] | 2 Maximum transmittance between 300 to 360 nm [%] | 3 UV cut-off wavelength [nm] | 4 Average transmittance between 450 to 600 nm [%] | 5 IR cut-off wavelength [nm] | 6 Average transmittance between 700 to 750 nm [%] | 7 Maximum transmittance between 750 to 1080 nm [%] |
| Ex. 1 | Initial value | 0.05 | 0.05 | 405 | 86.32 | 631 | 0.70 | 0.27 |
| | After test | 0.01 | 0.01 | 410 | 86.02 | 632 | 0.62 | 0.15 |
| | Amount of change | 0.04 | 0.04 | 5 | 0.30 | 1 | 0.08 | 0.12 |
| Ex. 2 | Initial value | 0.04 | 0.04 | 404 | 86.93 | 638 | 1.64 | 0.33 |
| | After test | 0.05 | 0.05 | 409 | 86.84 | 638 | 1.43 | 0.27 |
| | Amount of change | 0.01 | 0.01 | 5 | 0.08 | 0 | 0.21 | 0.06 |

| | | Optical properties | | | | | | |
|---|---|---|---|---|---|---|---|---|
| | | 8 Maximum transmittance between 800 to 950 nm [%] | 9 Maximum transmittance between 800 to 1000 nm [%] | 10 Maximum transmittance between 800 to 1050 nm [%] | 11 Maximum transmittance between 800 to 1100 nm [%] | 12 Maximum transmittance between 800 to 1150 nm [%] | 13 Maximum transmittance between 800 to 1200 nm [%] | 14 Difference between IR cut-off wavelength and UV cut-off wavelength [nm] |
| Ex. 1 | Initial value | 0.27 | 0.27 | 0.27 | 0.27 | 0.58 | 2.41 | 225 |
| | After test | 0.15 | 0.15 | 0.15 | 0.15 | 0.42 | 1.81 | 222 |
| | Amount of change | 0.12 | 0.12 | 0.12 | 0.12 | 0.16 | 0.60 | 3 |
| Ex. 2 | Initial value | 0.13 | 0.13 | 0.25 | 0.48 | 1.59 | 4.90 | 235 |
| | After test | 0.25 | 0.25 | 0.25 | 0.37 | 1.24 | 4.14 | 230 |
| | Amount of change | 0.12 | 0.12 | 0.00 | 0.11 | 0.35 | 0.77 | 5 |

The invention claimed is:

1. A light-absorbing composition comprising:

a light absorber;

a curable resin; and an alkoxysilane, wherein the alkoxysilane includes a dialkoxysilane and a content of the dialkoxysilane in the alkoxysilane is 15 to 48% on a mass basis when a mass of the alkoxysilane is calculated as a mass of a complete-hydrolysis-condensation product of the alkoxysilane.

2. The light-absorbing composition according to claim 1, wherein the dialkoxysilane has a hydrocarbon group bonded to a silicon atom and having 1 to 6 carbon atoms or a halogenated hydrocarbon group in which at least one hydrogen atom of the hydrocarbon group is substituted by a halogen atom.

3. The light-absorbing composition according to claim 1, wherein the alkoxysilane further includes at least one of a tetraalkoxysilane and a trialkoxysilane.

4. The light-absorbing composition according to claim 1, wherein the alkoxysilane further includes a tetraalkoxysilane and a trialkoxysilane.

5. The light-absorbing composition according to claim 1, wherein a content of the dialkoxysilane in the alkoxysilane is 15 to 20% on a mass basis when a mass of the alkoxysilane is calculated as a mass of a complete-hydrolysis-condensation product of the alkoxysilane.

6. The light-absorbing composition according to claim 1, wherein the light absorber is formed of a phosphonic acid represented by the following formula (a) and copper ion:

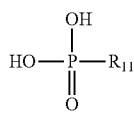
(a)

where $R_{11}$ is an alkyl group, an aryl group, a nitroaryl group, a hydroxyaryl group, or an aryl halide group in which at least one hydrogen atom of an aryl group is substituted by a halogen atom.

7. An optical filter comprising a light-absorbing layer formed of a cured product of the light-absorbing composition according to claim 1.

8. The optical filter according to claim 7, wherein
the light-absorbing layer has an average Young's modulus of 2.00 GPa or less and an average hardness of 0.06 GPa or less when a principal surface of the light-absorbing layer is measured using a nanoindenter by a nanoindentation technique (continuous stiffness measurement technique).

9. The optical filter according to claim 8, wherein the alkoxysilane includes a dialkoxysilane.

10. The light-absorbing composition according to claim 1, wherein the light-absorbing composition is capable of forming a light-absorbing layer that has an average Young's modulus of 2.00 GPa or less and an average hardness of 0.06 GPa or less measured using a nanoindenter by a nanoindentation technique (continuous stiffness measurement technique).

11. The light-absorbing composition according to claim 1, wherein
the light-absorbing composition is capable of forming a light-absorbing layer that has a first transmission spectrum before a moisture resistance test and a second transmittance spectrum after the moisture resistance test, where the moisture resistance test is a test in which the light absorbing layer is placed in an environment at a temperature of 85 degrees Celsius and a relative humidity of 85% for 1000 hours,
the first transmission spectrum and the second transmission spectrum satisfy the following (i) and (ii):
(i) the absolute value of a difference between a first average value of the transmittance in the wavelength range of 450 to 600 nm in the first transmission spectrum and a second average value of the second transmittance in the wavelength range of 450 to 600 nm in the second transmission spectrum is 3 points or less;
(ii) the first transmittance spectrum has a first UV cut-off wavelength in which a transmittance is 50% in a wavelength range of 350 nm to 450 nm, the second transmittance spectrum has a second UV cut-off wavelength in which a transmittance is 50% in a wavelength range of 350 nm to 450 nm, the absolute value of the difference between the first UV cut-off wavelength and the second UV cut-off wavelength is 5 nm or less, and
the first transmittance spectrum has a first IR cut-off wavelength in which a transmittance is 50% in a wavelength range of 600 nm to 800 nm, the second transmittance spectrum has a second IR cut-off wavelength in which a transmittance is 50% in a wavelength range of 600 nm to 800 nm, the absolute value of the difference between the first IR cut-off wavelength and the second IR cut-off wavelength is 5 nm or less.

12. The light-absorbing composition according to claim 11,
wherein the first transmission spectrum and the second transmission spectrum further satisfy the following (iii) and (iv):
(iii) the absolute value of a difference between a first full width at half maximum calculated by subtracting the first UV cutoff wavelength from the first IR cutoff wavelength and a second full width at half maximum calculated by subtracting the second UV cutoff wavelength from the second IR cutoff wavelength is 10 nm or less;
(iv) the absolute value of a difference between a maximum transmittance in a wavelength range of 300 nm to 350 nm in the first transmittance spectrum and a maximum transmittance in a wavelength range of 300 nm to 350 nm in the second transmittance spectrum is 1 point or less.

13. The optical filter according to claim 7, wherein
the optical filter has a first transmission spectrum before a moisture resistance test and a second transmittance spectrum after the moisture resistance test, where the moisture resistance test is a test in which the light absorbing layer is placed in an environment at a temperature of 85 degrees Celsius and a relative humidity of 85% for 1000 hours,
the first transmission spectrum and the second transmission spectrum satisfy the following (i) and (ii):
(i) the absolute value of a difference between a first average value of the transmittance in the wavelength range of 450 to 600 nm in the first transmission spectrum and a second average value of the second transmittance in the wavelength range of 450 to 600 nm in the second transmission spectrum is 3 points or less;
(ii) the first transmittance spectrum has a first UV cut-off wavelength in which a transmittance is 50% in a wavelength range of 350 nm to 450 nm, the second transmittance spectrum has a second UV cut-off wavelength in which a transmittance is 50% in a wavelength range of 350 nm to 450 nm, the absolute value of the difference between the first UV cut-off wavelength and the second UV cut-off wavelength is 5 nm or less, and
the first transmittance spectrum has a first IR cut-off wavelength in which a transmittance is 50% in a wavelength range of 600 nm to 800 nm, the second transmittance spectrum has a second IR cut-off wavelength in which a transmittance is 50% in a wavelength range of 600 nm to 800 nm, the absolute value of the difference between the first IR cut-off wavelength and the second IR cut-off wavelength is 5 nm or less.

14. The optical filter according to claim 13, wherein
the first transmission spectrum and the second transmission spectrum further satisfy the following (iii) and (iv):
(iii) the absolute value of a difference between a first full width at half maximum calculated by subtracting the first UV cutoff wavelength from the first IR cutoff wavelength and a second full width at half maximum calculated by subtracting the second UV cutoff wavelength from the second IR cutoff wavelength is 10 nm or less;
(iv) the absolute value of a difference between a maximum transmittance in a wavelength range of 300 nm to 350 nm in the first transmittance spectrum and a maximum transmittance in a wavelength range of 300 nm to 350 nm in the second transmittance spectrum is 1 point or less.

15. The optical filter according to claim 7, wherein
the optical filter is capable of being cut into a plurality of striped-shaped pieces without exhibiting a breakage nor a fracture when viewed under a metallurgical microscope at 50× magnification.

* * * * *